Nov. 2, 1926.
F. PLINKE
1,605,564
ABSORPTION AND COOLING APPARATUS
Filed August 30, 1921
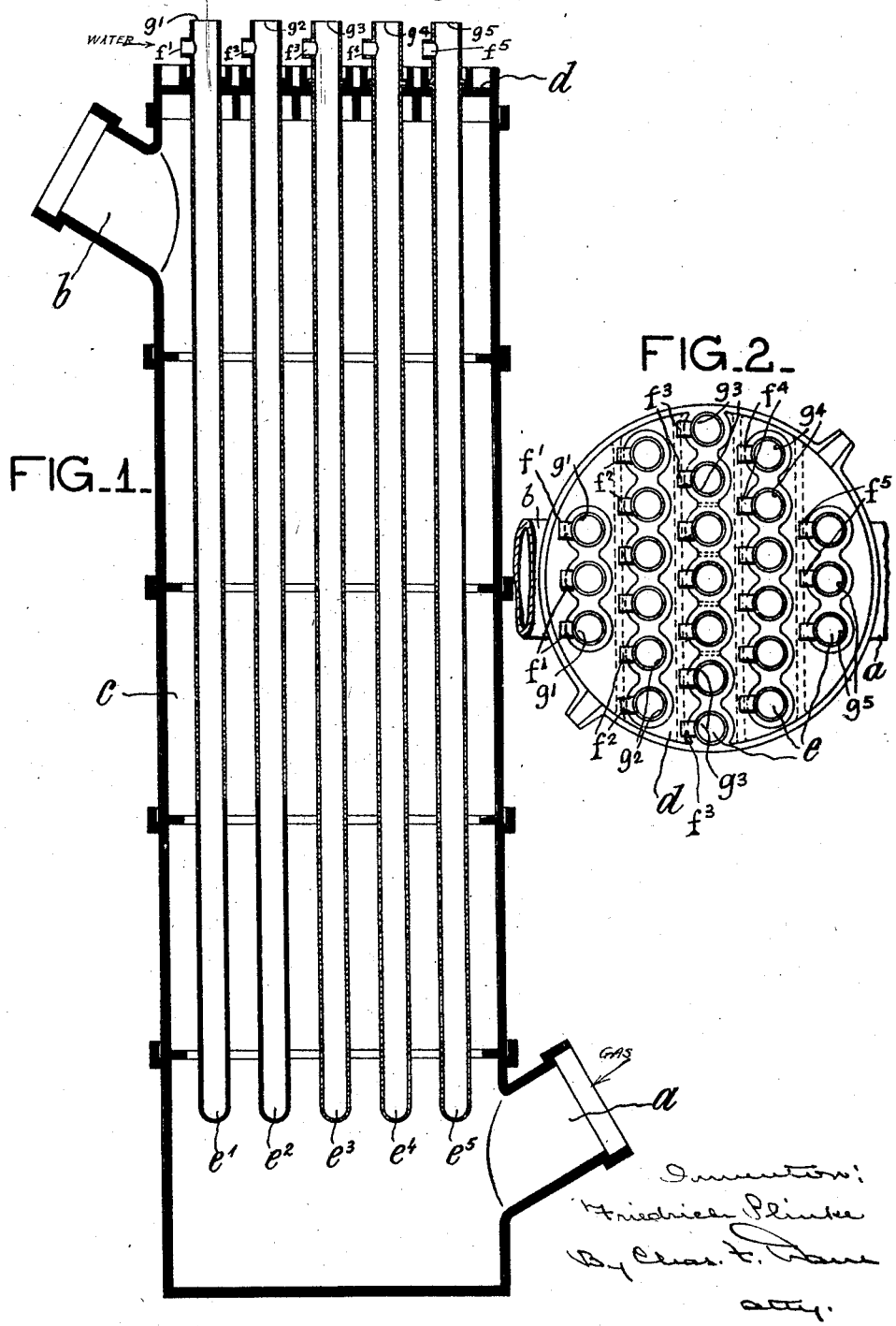

Patented Nov. 2, 1926.

1,605,564

UNITED STATES PATENT OFFICE.

FRIEDRICH PLINKE, OF CHARLOTTENBURG, GERMANY, ASSIGNOR TO GENERAL CERAMICS COMPANY, OF KEASBY, NEW JERSEY, A CORPORATION OF NEW JERSEY.

ABSORPTION AND COOLING APPARATUS.

Application filed August 30, 1921, Serial No. 497,006, and in Germany May 7, 1920.

(GRANTED UNDER THE PROVISIONS OF THE ACT OF MARCH 3, 1921, 41 STAT. L., 1313.)

This invention relates to improvements in absorption and cooling apparatus.

In the manufacture of hydrochloric acid, batteries of absorption vessels of various forms are usually employed, which are followed by a number of absorption towers, in order to recover the last traces of the acid. These batteries require much space and, in case a strong acid is to be produced, a large quantity of cooling water. The attempt to replace the batteries of vessels by absorption towers has hitherto not proved successful. It has been attempted to remove the heat of absorption outside the towers by cooling the gases as well as the liquid and for cooling purposes boxes of sandstone, towers of sandstone, earthenware towers with suspended cooling pipes and the like were employed. These devices have proved only partly successful, because the principal portion of the heat to be conducted away in the manufacture of hydrochloric acid is not carried along by the gas escaping from the furnace, but is generated during the absorption of the gas by water. Success can therefore only be attained if the heat can be conducted away from the place where it is generated.

This problem is solved by the invention forming the object of this application. According to this invention towers with suspended cooling tubes are employed, which are so constructed, that they simultaneously effect the absorption of the hydrochloric acid gas and the cooling of the acid, whereby a portion of the cooling water absorbs the hydrochloric acid gases and the heat generated is at once conducted away. The cooling apparatus is in this manner made to act at the same time as the absorption apparatus. This effect is attained by making the suspended tubes of a pervious or porous material, which allows a certain portion of the cooling water to escape through the walls of the tubes. This quantity of water reaching the outside of the tubes at a very low temperature effects a very energetic absorption of the hydrochloric acid gas and the heat thus generated is at once led away by the cooling water circulating within the tubes, while the hydrochloric acid produced remains within the cooling tower where it can be withdrawn as required. In this manner the apparatus, which may not only be used in the manufacture of hydrochloric acid but for all absorptions in which the generation of heat takes place, acts simultaneously as absorption and as cooling apparatus.

The improved combined cooling and absorption apparatus is illustrated in the accompanying drawing, in which—

Fig. 1 is a vertical section and

Fig. 2 a plan.

The tower $c$ made of earthenware is provided with a gas inlet $a$ and a gas outlet $b$ and is closed by a cover $d$, into which tightly fit the suspended cooling tubes $e^1$ to $e^5$, through which the cooling water circulates in the usual manner. In order to effect the circulation of the water, the tubes are provided with nipples, such as $f^1$, $f^2$ etc., connected with the water supply, near their upper ends, which latter are either left open as at $g^1$ $g^2$ etc., to provide a free overflow for the water or may be severally connected to a common receiving tank or reservoir. In such an arrangement, the cold water entering the tubes sinks in the tubes and displaces a like amount of the hot water, the cold and the hot water flowing in counter currents in the individual tubes in the well known manner characteristic of the single line radiator systems.

In order to make the tubes porous according to the invention and as indicated in Fig. 1, the cooling tubes are either made of a porous material or of an impervious material provided with fine perforations through which the cooling water is able to pass.

In certain cases it may be found advantageous to use tubes which are not porous or pervious throughout their entire lengths, but to employ tubes in which only the intermediate portions are pervious to water, the upper and lower portions being rendered non-porous or impervious, which may be effected either by omitting the perforations in these portions of the tubes, or by applying a suitable glaze or other appropriate means to the portions aforesaid, as will be understood. In order to obtain the best results it is, under certain circumstances, advisable to use both types of tubes in the same apparatus. Both types of tubes are illustrated in Fig. 1 of the drawings, in which the tubes $e^1$ and $e^2$ are shown as having the intermediate portions of their walls porous or pervious to water, while the lower ends, and preferably also the upper ends of the tubes are impervious or water-tight, the remaining tubes $e^3$, $e^4$ and $e^5$ being shown as having pervious or porous walls throughout. The particular advantage of the tubes having the lower portions of their walls impervious is that the gases circulating in the tower $c$ are subjected to a preliminary cooling by contact with the water in the lower impervious portions of the tubes, while the relatively cool water in the intermediate and upper portions of the tubes penetrates through said portions of the walls and comes into contact with the partially cooled gases, under ideal conditions to facilitate the absorption of the gases by the water.

In order to provide substantially uniform passages for the gases circulating in the tower and among the tubes, and therefore to effect a practically uniform rate of cooling and absorption, the tubes are preferably arranged in parallel rows with the tubes of adjacent rows disposed in staggered relation, as more particularly illustrated in Fig. 2.

What I claim as my invention and desire to secure by United States Letters Patent is:

1. A combined absorption and cooling apparatus for gases and the like, comprising a compartment having an inlet and an outlet to provide a circulation of the gas through said compartment, tubes having pervious walls extending into said compartment, and means for supplying and delivering water to and from said tubes; whereby a portion of the water will circulate through the tubes and absorb heat and a portion of the water will penetrate the walls of the tubes and absorb the gas.

2. A combined absorption and cooling apparatus for gases and the like, comprising a tower having a gas inlet in its lower portion and a gas outlet near the upper portion, and tubes extending longitudinally of the tower having impervious lower portions and pervious intermediate portions, said tubes having water inlet and discharge openings near their upper ends; whereby a cooling circulation of water will be maintained in said tubes and a portion of the water will penetrate the pervious walls and absorb the gas in the tower.

In testimony whereof I have signed my name to this specification.

FRIEDRICH PLINKE.